United States Patent [19]

Jorgensen

[11] 4,414,780
[45] Nov. 15, 1983

[54] GEAR BURNISHING AND HONING MACHINE

[76] Inventor: Arne R. Jorgensen, 1041 S. Norbury, Lombard, Ill. 60148

[21] Appl. No.: 295,173

[22] Filed: Aug. 21, 1981

[51] Int. Cl.³ .................. B24B 39/00; B24B 15/00
[52] U.S. Cl. ............................. 51/26; 51/230; 51/232; 29/90 R; 29/90 B
[58] Field of Search ............. 29/90.1, 90 A, 90 B, 29/90 R; 51/26, 230, 232; 269/32, 257, 258, 274, 275, 286

[56] References Cited

U.S. PATENT DOCUMENTS

| | | | |
|---|---|---|---|
| 1,990,239 | 2/1935 | Miller | 29/90 |
| 2,208,959 | 7/1940 | Cain | 269/32 |
| 2,374,784 | 5/1945 | Simpson | 51/26 |
| 3,321,820 | 7/1965 | Rosendahl | 29/90 X |

Primary Examiner—E. R. Kazenske
Assistant Examiner—Willmon Fridie, Jr.
Attorney, Agent, or Firm—David I. Roche; Donald D. Monbul; Thomas W. Buckman

[57] ABSTRACT

A gear finishing machine is provided which utilizes a driven rotary finishing gear and two idler finishing gears. In addition a reciprocating oscillatory mechanism that employs leaf springs as the coupling member, changes rotary into reciprocating motion, which serves to oscillate the workpiece gear across the finishing gears. The machine is capable of either burnishing or honing the workpiece gear according to the ratio of the rotary to sliding velocity of the workpiece gear relative to the finishing gears, duty cycle, and loading pressures. Sensors are utilized which detect undersize and oversize gears, the withdrawing of the driven burnishing gear to the correct location to eject the workpiece gear and the presence of gears in the input and output chute which serve as control signals for the machine.

11 Claims, 6 Drawing Figures

GEAR BURNISHING AND HONING MACHINE

BACKGROUND OF THE INVENTION

The heavy-duty gear burnishing and honing machine of the present invention may have an adjustable duty cycle, and it is capable of finishing gears of various sizes. The rotational speed of the finishing gears, which do the burnishing or honing, is controlled independently of an oscillatory reciprocating motion that is applied to the workpiece gear so that precisely controlled surface finishes can be achieved on hardened gears. High machine speed and low load with abrasive gears provides more of a honing action while a slow machine speed and high load with hardened gears, made with M-2 tool steel, for example, provides more of a burnishing action. A high relative reciprocating speed relative to the rotating speed with a hunting tooth effect provides a uniform wear pattern across the workpiece tooth profile. If there is oscillation, its frequency, the pressure of the finishing gears upon the workpiece gear, the construction of the finishing gears and whether or not they have any hardened materials applied to their surface such as carbide or diamond containing materials are the important factors. In this document, therefore, when the term "burnishing" is used, it is to be understood that the term includes both burnishing and honing.

The versatile heavy-duty honing and burnishing machine of the present invention is capable of handling a large variety of gear sizes. The machine has an adjustable duty cycle and the pressure applied by the burnishing gears on the workpiece gear is adjustable over a wide range also which makes the machine suitable for burnishing soft gears as well as hard gears. The burnishing gears are wider than the workpiece gear so that the workpiece gear can be burnished anywhere along the full width of the burnishing bears, which maximizes life of the burnishing gears. Operating the gear burnisher at high load and low speed on a short duty cycle will remove scale due to heat treatment and minor nicks prior to gear inspection.

With a short duty cycle, it is generally best to use special burnishing gears in the machine that will provide some sliding over the complete tooth profile. This can be accomplished by utilizing one burnishing gear which has a high operating pressure angle and a second burnishing gear which has a low operating pressure angle, as shown and described in pending United States patent application Ser. No. 152,446, now U.S. Pat. No. 4,305,190 assigned to the assignee of the present invention, and filed May 22, 1980 in the name of Henry J. Flair. Reversing rotation of the burnishing gears approximately half way through the duty cycle will reverse the direction of sliding action of these gears above and below the two pitch lines which will provide an appreciably improved surface finish.

Large swage type nicks on the workpiece gear generally require a relatively longer duty cycle, more sliding action, possibly the use of coolant, and if an abrasive honing gear is used, a reduced loading. More uniform sliding action can be accomplished by reciprocating the workpiece gear at a high rate while rotating the burnishing gear at slow speeds in order to achieve a reversing dead-spot hunting effect. Rotation over two revolutions of the burnished gear assures that the short reversing dead-spot will be subject to near peak velocity on the second revolution, and in this way, the full profile of all gear teeth of the workpiece gear will be subjected to a relatively uniform sliding action. High reciprocating rates of the workpiece gear tends to minimize the need for using both high operating pressure angle and low operating pressure angle burnishing gears on the type described in the aforementioned prior United States patent application Ser. No. 152,446.

Reliable loading, guaranteed gear engagement, assured gear discharge and immunity to abrasives are all essential to minimizing maximum down times and maximizing daily production rates. A pressure arm is pivoted so that it can be swung in the direction of the discharge chute to a retracted stop position which positions the driven burnishing gear so that it will prevent a new workpiece gear from passing through the burnishing station without stopping. This position of the driven burnishing gear also insures that this burnishing gear will drive the workpiece gear toward the discharge chute in a positive manner, instead of kicking it out as the pressure arm and the driven burnishing gear swings away from the discharge chute, in the manner shown and described in prior U.S. Pat. No. 2,321,800, issued May 30, 1967 in the name of Gunther Rosendahl, which patent is assigned to the assignee of the present invention.

When the workpiece gear is discharged by being propelled by the driven gear out of the burnishing station, the workpiece gear rides over the top of the idler burnishing gear which is adjacent the discharge chute and which has its rotation stopped by a controllable brake. A proximity switch senses the motion of the workpiece gear down the discharge chute and results in a control signal being generated which allows a new gear to be sent down the input chute. The burnishing cycle does not progress at high speed and high pressure until after the burnishing gears have engaged the new workpiece gear. If for some reason the new workpiece gear is not engaged by the pivotable driven burnishing gear on the first attempt, the pressure arm will pivot the driven gear back to its withdrawn position and will reverse and come in for a second try at attempting to engage the new workpiece gear.

The engagement cycle for the driven burnishing gear with a workpiece gear is under the control of a proximity sensor located at a fixed position on the machine. A pair of spaced-apart metallic washers are mounted to move with the pivotable pressure arm that carries the driven burnishing gear and as the two washers move towards the proximity sensor, the pressure arm pivots downwardly and the driven burnishing gear approach the workpiece gear. When the first washer moves past the proximity sensor, air pressure to the air cylinder that controls the pivoting of the pressure arm and the driven burnishing gear is turned off under control of the sensor as the teeth of the driven burnishing gear engage the teeth of the workpiece gear. When the teeth of the burnishing gears are in engagement with a workpiece gear of the proper pitch diameter, the second sensing washer will be sensed by the proximity sensor which causes the air cylinder to be again actuated so to apply the correct amount of burnishing pressure to the workpiece gear.

However, if the workpiece gear is undersize, the proximity sensor will lose the signal it received from the second washer as the second washer drops past the proximity sensor, which indicates to the control panel that an undersized gear is present. The machine also may be automatically shut off if desired. In the event that the proximity sensor does not sense the second washer, another light on the control panel may indicate that the workpiece gear is oversized and is not engaged by the burnishing gear. In this case the pressure arm will recycle for a second attempt, and if this attempt is unsuccessful, the machine will be turned off.

The reciprocating action of the workpiece gear across the burnishing gears is obtained through a very simple mechanical arrangement of leaf springs which support a C-shaped frame and live-center face pads, which support and take the thrust of the workpiece gear. This mechanical arrangement eliminates the need for sliding gibs which are subject to excessive wear in the presence of abrasive particles that result when a honing action is taking place. All bearings in the machine preferably have their seals flushed periodically with an automatic lubrication system in order to keep abrasives out of the bearings.

DESCRIPTION OF THE DRAWINGS

The present invention is illustrated by reference to the drawings in which.

TECHNICAL DESCRIPTION OF THE INVENTION

Figure 1:
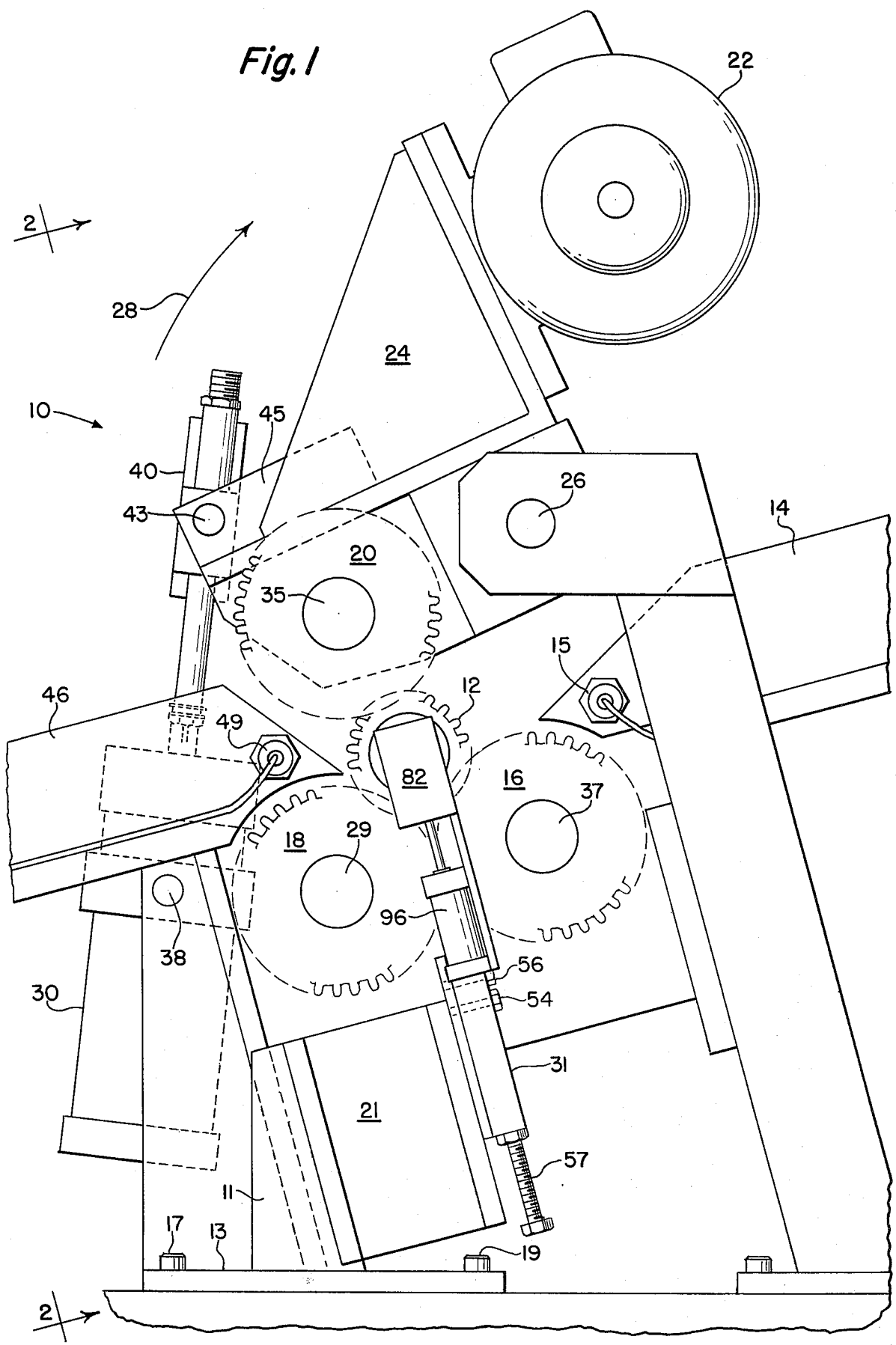
FIG. 1 is a side view of the gear burnishing machine that shows various elements in phantom through the employment of dotted lines.
Figure 2:
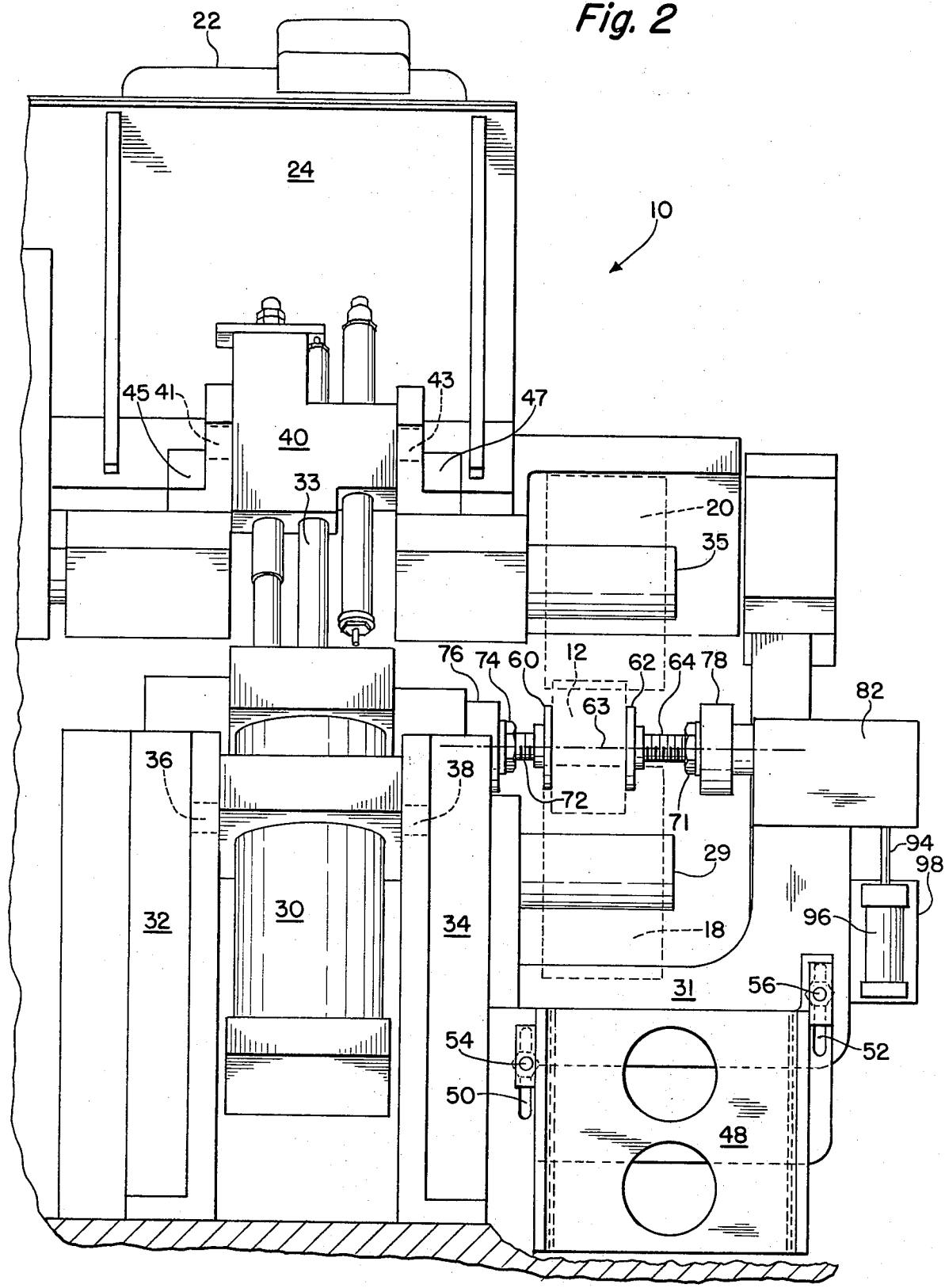
FIG. 2 is an end view of the gear burnishing machine of FIG. 1.

The gear burnishing and honing machine of the present invention as shown by reference to the drawings in which FIG. 1 is a side view of the machine 10. The workpiece gear 12 that is to be burnished by the machine rolls down the input chute 14, which is inclined slightly to the horizontal and terminates at its lower end above the right hand idler burnishing gear 16, which is supported by shaft 37. As the gear 12 rolls down the chute 14, it passes the proximity sensor 15 which indicates that a new gear has been fed down the chute. The left hand idler burnishing gear 18, which is supported by shaft 29, in combination with the right hand idler burnishing gear 16 supports the workpiece gear 12 in the burnishing station. A driven burnishing gear 20, which is supported by shaft 35, is secured to the pivotable pressure arm 24 so that it may move toward and away from the workpiece gear. When the driven burnishing gear 20 is in engagement with the top of the workpiece gear 12, burnishing action is achieved by rotation of the driven burnishing gear 20 and the two idler burnishing gears 16, 18. Simultaneously, with the rotation of the burnishing gears, the workpiece gear may, if desired, be reciprocally oscillated back and forth across the burnishing gears. The control of the rotary speed of the burnishing gears and the reciprocating oscillatory motion of the workpiece gear are completely independent, which allows for a wide variety of rotary to reciprocating speed ratios, including only rotation or reciprocation.

The burnishing gear 20 is rotated by means of a conventional chain or belt drive (not shown) powered by the electric motor 22. The driven burnishing gear 20 and the motor 22 are both mounted on the pressure arm 24 which pivots about the shaft 26. When a workpiece gear, such as the gear 12, is fed into the work station, the pressure arm 24 is pivoted upwardly in the direction of the arrow 28 so that the lower part of the driven gear 20 allows for the new workpiece gear to be fed into the work station, but will not allow the new workpiece gear to pass over the top of the idler burnishing gear 18. Initially both of idler gears 16, 18 are held from rotating by a controllable brake (not shown).

Pivoting of the pressure arm 24 and the driven burnishing gear 20 upwardly is accomplished when the air cylinder 30 is actuated so as to force the shaft 33 upwardly. The air cylinder 30 is a double acting cylinder which can be actuated under air pressure so as to either force the shaft 33 upwardly, in the direction of the arrow 28, or to pull it downwardly, opposite to the direction of the arrow 28, with respect to a central deactuated position. The air cylinder is supported by the shafts 36, 38 which in turn are supported by the walls 32, 34 of the frame of the machine. When the air cylinder is actuated and its drive shaft 33 moves upwardly, the block 40 which is secured to the end of the drive shaft 33 also will move upwardly. The drive block 40 is coupled to the walls 45, 47 of the pressure arm by the shafts 41, 43 which are supported by these walls.

The workpiece gear 12 may, if desired, be oscillated back and forth during burnishing when it is in the work station between the burnishing gears 16, 18 and 20, as shown in the drawings. This oscillating action is driven by a second, independently controlled electric motor (not shown) whereby the rate of this oscillation may be variable with respect to the rate of rotation of the burnishing gears that is under the control of the electric motor 22. During burnishing or honing action, the driven burnishing gear 20 first rotates in one direction and then half way through the cycle it decelerates, reverses its rotation and accelerates and rotates in the opposite direction thereby burnishing the gear teeth surfaces more uniformly. After the workpiece gear 12 has been burnished, it is ejected during pivoting of the pressure arm 24 and raising of the driven burnishing gear 20 so that the workpiece gears are driven up and over the idler burnishing gear 18 and into the inclined output chute 46 by the driven burnishing gear 20. The idler burnishing gears 16, 18 are braked by a conventional brake (not shown) at this time. When the workpiece gear rolls down the chute 46 the proximity sensor 49 generates a signal that indicates a burnished or honed gear has been sent from the work station. The electrical control circuit, which utilizes the various sensor signals developed by the sensors of the burnishing machine of the present invention, employs conventional sensing and control circuit technology which is independent of the present invention. The control circuitry is, therefore, not described in detail herein because of its conventional nature. Conventional parts such as motors, brakes etc. are similarly also not shown as their use and design is obvious to those skilled in the art.)

Different size workpiece gears may be accommodated in the gear burnisher of the present invention by adjustment mechanisms provided in a C-shaped support frame 48 which is coupled to the arm 31 that supports the workpiece gear 12 between the face pads 60, 62. The frame 48 has a pair of vertical elongated adjustment slots 50, 52 and corresponding locking fasteners 54, 56 which allow for adjustment of the center of the face pads 60, 62 with respect to the central axis 63 of the workpiece gear 12. One of the pads 60, 62 engages a side face of the workpiece gear 12 during reciprocation while the other pad is spaced slightly from the other face, according to the direction of reciprocation at the time. The adjustment of the frame 48 is controlled by the adjustment screw 57. Varying widths of workpiece gears may also be accommodated by adjustment of the position of the pad 62 by rotation of the threaded shaft 64 until the desired location is reached, and then the locknut 71 may be threaded against the threaded bushing 77 in the housing 78 to lock the shaft 64 in place. The housing 78 fits into a recess 79 in the housing 83. The pad 60 is secured to the shaft 72 which is secured in place by the locknut 74 on the threaded end of the shaft 72 which is threaded against a threaded bushing 75 in the housing 76.

The pads 60, 62 are made so that they may wobble at the ends of their supporting shafts 64, 72 so that they may accommodate for changes in orientation of the workpiece gear 12. This is accomplished by providing loose fitting roll pins 66 (FIG. 4) in slots 67 at the end of the respective shafts 64, 72 so that the orientation of the pads 60, 62 will conform to the orientation of the side faces of the workpiece gear 12. A thin resilient elastomeric pad material 68 is preferably also employed behind the pads 60, 62 to allow for limited resilient back and forth motion of the pads.

The workpiece gear is supported in place by the pads 60, 62 which are spaced to allow for a slight clearance of the pads from the faces of workpiece gear when reciprocating oscillation is not taking place by the pivotal motion of the link 84. The link 84 is coupled to pivot post 86 on a horizontal sliding block 88 in the housing 82 at one end and to a pivot post 90 that is coupled to a vertical sliding block 92 in the housing 82 at its other end. The block 92 is internally threaded to receive the upper threaded end of the shaft 94 which is the operating shaft of the air cylinder 96. The shaft 94 is locked into place against the block 92 by means of the locknut 97. The air cylinder 96, which is on the vertically extending arm 98, is deactuated, so that its air pressure is released, when the burnishing of the workpiece gear has been completed and the workpiece gear is to be ejected from the work station. When the air cylinder 96 is deactuated, the shaft 94 moves downwardly allowing the sliding block 92 to move downwardly and the sliding block 88 to move to the right which thereby pulls the pad 62 away from the workpiece gear. When a new workpiece gear is to be locked into place between the pads, the air cylinder is actuated and the increased air pressure forces the shaft 94 upwardly, which in turn forces the sliding block 92 upwardly and the sliding block 88 to the left, so that the pad 62 moves to the left toward the new workpiece gear.

Figure 3:
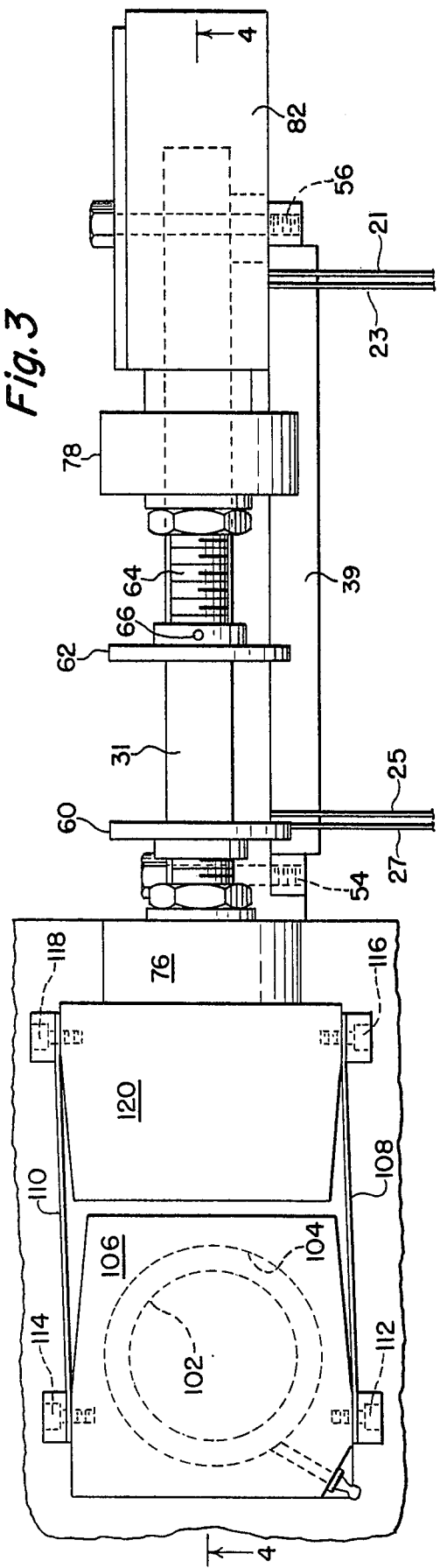
FIG. 3 is a partial top view of the gear burnishing machine of FIG. 1 which shows the oscillating mechanism that is employed to reciprocate the workpiece gear during burnishing.
Figure 4:
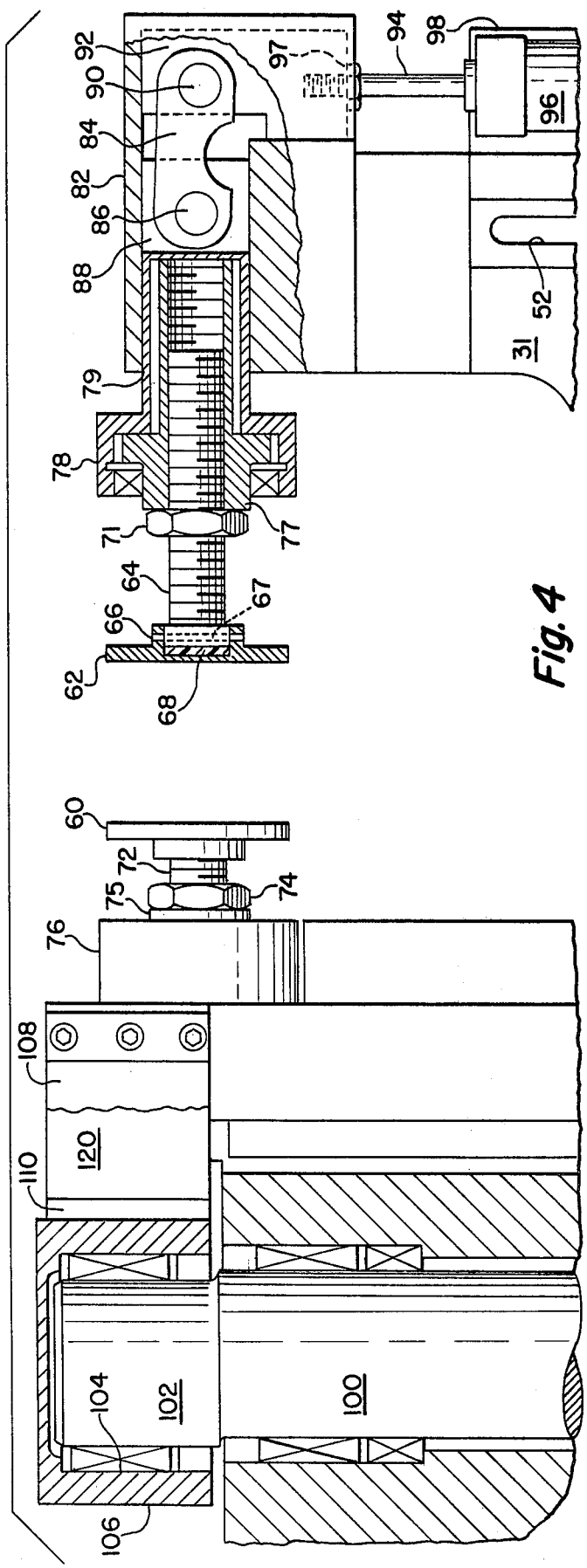
FIG. 4 is a cross-sectional view of FIG. 3 taken along the lines of 4—4.

Oscillation of the workpiece gear 12 back and forth along the direction of its axis 63, while one or the other of the face pads 60, 62 engages the adjacent face of the workpiece gear, is accomplished by the oscillation mechanism that is best shown in FIGS. 3 and 4 which includes the vertical shaft 100 that is driven in a rotary manner by a conventional pulley or drive gear arrangement (not shown) by the aforementioned second motor. The upper end of the shaft 100 carries an eccentric 102 which acts as a cam on a cam follower recess 104 in the oscillating head 10. A pair of leaf springs 108, 110 are secured at one end to the oscillating head 106 by the bolts 112, 114, and at their other end to a drive member 120 by means of the bolts 116, 118. The drive member 120 is secured to the C-shaft frame 48 so that the pads 60, 62 and entire frame 48 oscillates as a unit as a result of the oscillatory motion of the leaf springs 108, 110. The leaf springs 108, 110 thus allow the rotary motion of the eccentric 102 in the recess 104 to be converted into reciprocating motion of the pads 60, 62.

Oscillation of the face pads 60, 62 and the workpiece gear 12 is accomplished by means of the two pairs of leaf springs 21, 23 and leaf springs 25, 27. Each leaf spring of a pair is closely spaced to the other leaf spring of the pair, but the two pairs of springs are relatively widely separated from each other. All of the leaf springs 21, 23, 25 and 27 are connected to the upper portion 39 of the arm 31. The opposite ends of all of the leaf springs are connected to a fixed bracket 11. The bracket 11 has a base plate 13 that is secured to the frame of the machine by the bolts 17, 19. Thus as the drive member 120 reciprocates back and forth the workpiece gear 12 and the face pads 60, 62 are able to oscillate back and forth by means of the swinging action of the leaf springs 21, 23, 25, and 27. While the leaf springs are shown in pairs, a single leaf spring could be connected to each end of portion 39 if it could support the desired load. Alternately, more than two leaf springs could be employed for each set of leaf springs if a heavier load was to be supported. The employment of leaf springs, as previously mentioned, eliminates the need for complex mechanical movements, such as gibs, and is especially desirable in an abrasive gear burnishing environment where abrasive material can interfere with the operation of the mechanical oscillating movement, especially when abrasive materials could otherwise penetrate into the bearings of the mechanical movement. The reciprocating motion of the workpiece gear 12 across the rotating burnishing gears 16, 18 and 20 thereby achieves a honing or a burnishing action, in accordance with the relative speed of rotation of the burnishing gears and the relative frequency of oscillation of the workpiece gear.

Figure 5:
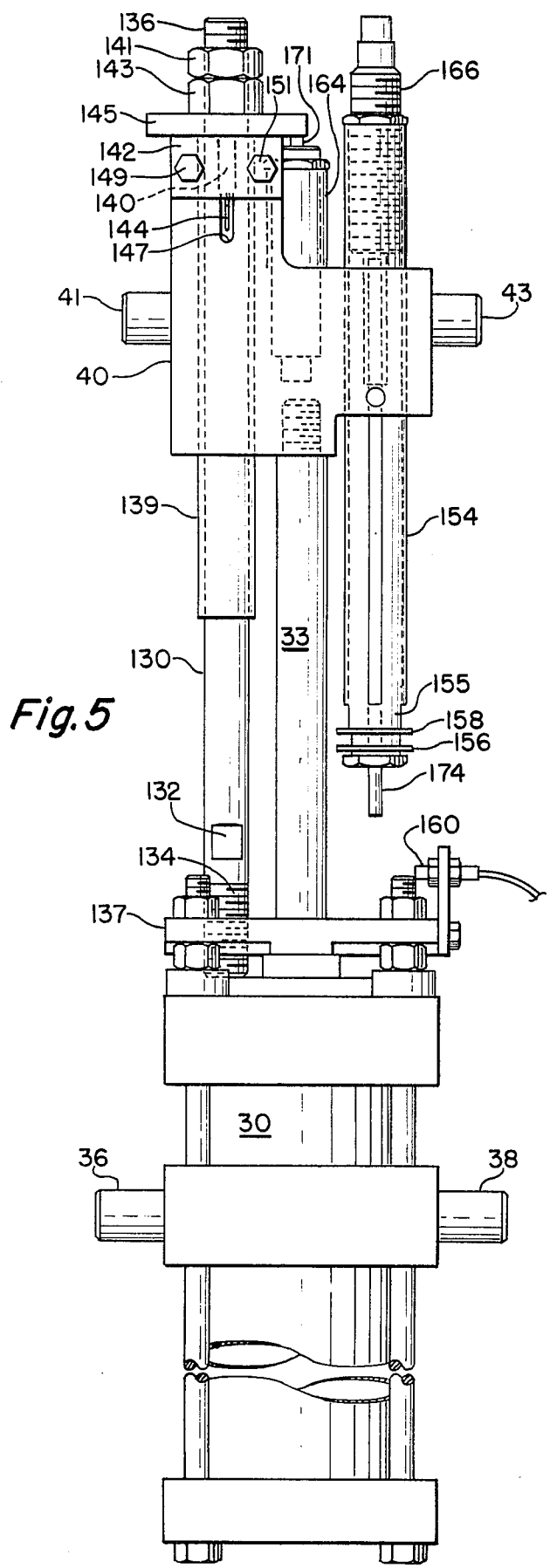
FIG. 5 is an enlarged view of the air cylinder that controls the pivoting of the pressure arm and of the pressure and size sensing mechanisms of the gear burnisher.
Figure 6:
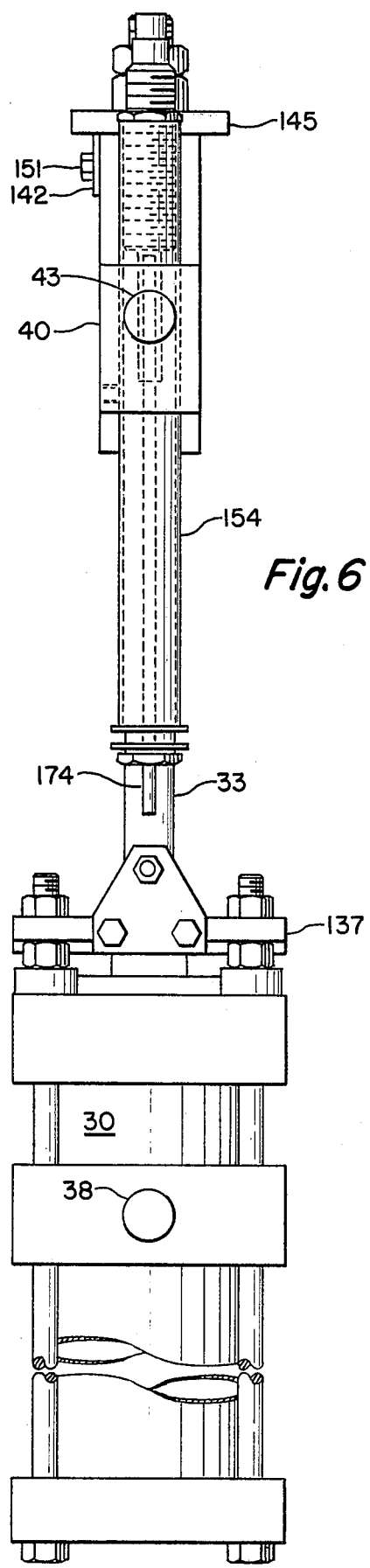
FIG. 6 is a side view of FIG. 5.

A sensing mechanism for detecting when the pressure arm 24 has been pivoted to the correct position to allow for a new workpiece gear 12 to enter the burnisher is best shown in FIGS. 5 and 6. The sensing mechanism includes an adjustable rod 130 which has a flat 132 that allows a wrench to be placed on the flat in order to rotate the rod 130 for adjustment. The rod 130 is threaded at its lower end with threads 134 that are screwed into internal threads in a support plate 137. The upper end of the rod 130 also carries threads 136 onto which a locknut 141 is screwed to limit the extent of movement of the block 40 in the vertical direction. The unitary assembly consisting of the nut head 143, the tube 139, the stop ring 145, which carries a proximity sensor 140, is locked at a preselected fixed position relative to the rod 130 by the locknut 141. The probe 144 of a conventional proximity sensor 140 extends into a slot 147 in the tube 136. A plate 142 of magnetically permeable material is used if magnetic sensing is employed, or alternately, conductive material may be used if eddy current sensing is employed. The plate 142 is secured to the block 40 by the bolts 149, 151. When the magnetic plate 142 moves past the probe 144 of the sensor 140, a signal is generated which indicates to the control circuit (not shown) that the pressure arm 24 has been pivoted to its correct location and the finished workpiece gear in the work station should be discharged so that a new workpiece gear can be fed to the work station. The adjustment of the position of the locknut 141, therefore, depends on the size of the workpiece gear.

The block 40 that is positioned by the shaft 33 of the air cylinder 30 carries a second tube 154 which supports a threaded shaft 155 that is threaded into internal threads in the tube 154 so its position may be adjusted. The shaft 155 has a pair of magnetically permeable, or conductive, spaced-apart washers 156, 158 threaded on it, one above the other. The positions of the washers 156, 158 act to control the amount of pressure the burnishing gears apply to the workpiece gear. When the first washer 156 is adjacent the proximity sensor 160, air pressure to the air cylinder is released during tooth engagement so that smooth tooth engagement of the burnishing and workpiece gears can take place. Once the teeth are engaged, air pressure is again applied to the air cylinder and the shaft 33 pulls the block 40 and the washer 158 down adjacent the sensor 160. If a correct size gear is in the work station, the sensor 160 will also sense the presence of the second washer 158. However, if an "undersized" gear is in the work station, the signal generated by the second washer 158 will be lost as the washer moves down past the sensor 160, and in this event an indicator on the control panel may be lit, or the machine may be shut off, as desired. On the other hand, if an "oversized" gear is present, the second washer 158 will not be sensed; and again a control panel light may be lit or the machine may be shut off. In operation, it is preferable that the machine cycle be controlled so that a second attempt at engagement of the burnishing gear 20 with the workpiece gear 12 be attempted in the event that the signal associated with the washer 158 is not produced before the machine is shut off.

A pair of shock absorbers 164, 166 are preferably employed in the machine to cushion it against excessive jarring forces. The shock absorber 164 is secured to move with the block 40 and its actuating shaft 171 engages the stop ring 145 as the driven burnishing gear 20 is withdrawn from the workpiece gear 12. The shock absorber 166 is secured so that its actuating shaft 174 protrudes past the washers 156, 158 enabling it to engage the support member 137 as the block 40 moves downwards towards the air cylinder and the driven burnishing gear 20 moves toward the workpiece gear 12.

What is claimed is:

1. A gear finishing machine comprising a plurality of rotational finishing elements which surround a work station, at least one of said finishing elements being a driven element, drive means for rotating said finishing elements, feed means for supplying a workpiece gear into said work station where it engages said finishing elements, and reciprocating means for imparting periodic reciprocating motion to said workpiece gear with respect to said rotating finishing elements at a rate independent of the rotation of said finishing elements, said reciprocating means including support means for holding said workpiece gear, said reciprocating means comprising a rotatable shaft, resilient rotary-to-linear motion converting means coupled to said shaft and said support means whereby linear motion is imparted to said workpiece gear, said converting means comprises a pair of spaced-apart leaf springs whereby said machine is capable of performing finishing operations at widely varying frequencies of reciprocation.

2. A gear finishing machine comprising a plurality of rotational finishing elements which surround a work station, at least one of said finishing elements being a driven element, drive means for rotating said finishing elements, feed means for supplying a workpiece gear into said work station where it engages said finishing elements and reciprocating means for imparting periodic reciprocating motion to said workpiece gear with respect to said rotating finishing elements at a rate independent of the rotation of said finishing elements, said reciprocating means including support means for holding said workpiece gear, and including at least one pair of leaf springs coupled between said support means and a fixed base whereby said machine is capable of performing finishing operations at widely varying frequencies of reciprocation.

3. A gear finishing machine as claimed in claim 2 wherein said support means includes a moveable frame which is generally C-shaped and is adjustable so as to control the lateral position of the axis of the workpiece gear relative to the position of said finishing elements, and first and second adjustable pads on opposite sides of said frame each of which is engageable with one face of said workpiece gear at least one of said pads being adjustable towards and away from said workpiece gear to allow for different width workpiece gears.

4. A gear finishing machine as in claim 3 further comprising pad support means and a roll pin for each of said pads which interacts with said pad support means so as to allow each of said pads to move relative to said pad support means in order to compensate for alignment changes of the face of said workpiece gear that said pad engages.

5. A gear finishing machine as claimed in claim 4 wherein resilient cushion means is located between each of said pads and said pad support means.

6. A gear finishing machine as claimed in claim 5 further comprising control means coupled to one of said pads for forcing said pad toward or away from the other pad, said control means comprising first sliding means coupled to said one of said pads capable of sliding toward and away from the other of said pads, second sliding means which slides back and forth on a different path of motion from the path said first sliding means, and actuation means to cause both said first and said second sliding means to slide simultaneously along their respective paths so that the spacing between said pads may be controlled.

7. A gear finishing machine comprising a plurality of rotational finishing elements which surround a work station, at least one of said finishing elements being a driven element, drive means for rotating said finishing elements, feed means for supplying a workpiece gear into said work station where it engages said finishing elements, and reciprocating means for imparting periodic reciprocating motion to said workpiece gear with respect to said rotating finishing elements at a rate independent of the rotation of said finishing elements, said reciprocating means including support means for holding said workpiece gear, a pivotable pressure arm supporting one of said rotational finishing elements, a pressure adjusting means for adjusting the amount of pressure applied by said driven finishing element on a workpiece gear, said pivotable pressure arm adapted to pivot out of the way of said workpiece gear upon completion of finishing whereby the pivotable pressure arm pivots in a manner such that said rotating finishing element engages and drives said workpiece gear up and over another of said finishing elements to discharge the gear from said work station, and further comprising pressure arm sensing means for detecting when said pressure arm has pivoted to a location appropriate for discharging a workpiece gear.

8. A gear finishing machine comprising a plurality of rotational finishing elements which surround a work station, at least one of said finishing elements being a driven element, drive means for rotating said finishing elements, feed means for supplying a workpiece gear into said work station where it engages said finishing elements, and reciprocating means for imparting periodic reciprocating motion to said workpiece gear with respect to said rotating finishing elements at a rate independent of the rotation of said finishing elements, said reciprocating means including support means for holding said workpiece gear, a pivotable pressure arm supporting one of said rotational finishing elements, a pressure adjusting means for adjusting the amount of pressure applied by said driven finishing element on a workpiece gear, said pivotable pressure arm adapted to pivot out of the way of said workpiece gear upon completion of finishing whereby the pivotable pressure arm pivots in a manner such that said rotating finishing element engages and drives said workpiece gear up and over another of said finishing elements to discharge the gear from said work station, and further comprising size sensing means for detecting undersize and oversize workpiece gears which comprises a fixed location sensor and first and second spaced-apart sensing actuating means coupled to move with said pressure arm so that failure of said sensing means to detect at least one of said actuating means indicates an undersize gear is present while detection of both of said actuating means by said sensing means indicates that an oversize gear is present.

9. A gear finishing machine as claimed in claim 7 further comprising size sensing means for detecting undersize and oversize workpiece gears which comprises a fixed location sensor and first and second spaced-apart sensing actuating means coupled to move with said pressure arm so that failure of said size sensing means to detect at least one of said actuating means indicates an undersize gear is present while detection of both of said actuating means by said size sensing means indicates that an oversize gear is present.

10. A gear finishing machine as claimed in claim 9 further comprising an air cylinder means coupled to said pivotable pressure arm for controlling the pressure applied to the workpiece gear.

11. A gear finishing machine as claimed in claim 10 further comprising a pair of shock absorbers positioned so that as said pressure arm moves toward said workpiece gear one of said shock absorbers prevents excessive shock as a result of this movement and when said pressure arm is withdrawn from said workpiece gear the other of said shock absorbers will prevent excessive shock resulting from this movement.

* * * * *